Feb. 6, 1923. 1,444,672.
J. DYER.
POWER LOADING AND UNLOADING DEVICE.
FILED JULY 1, 1921.
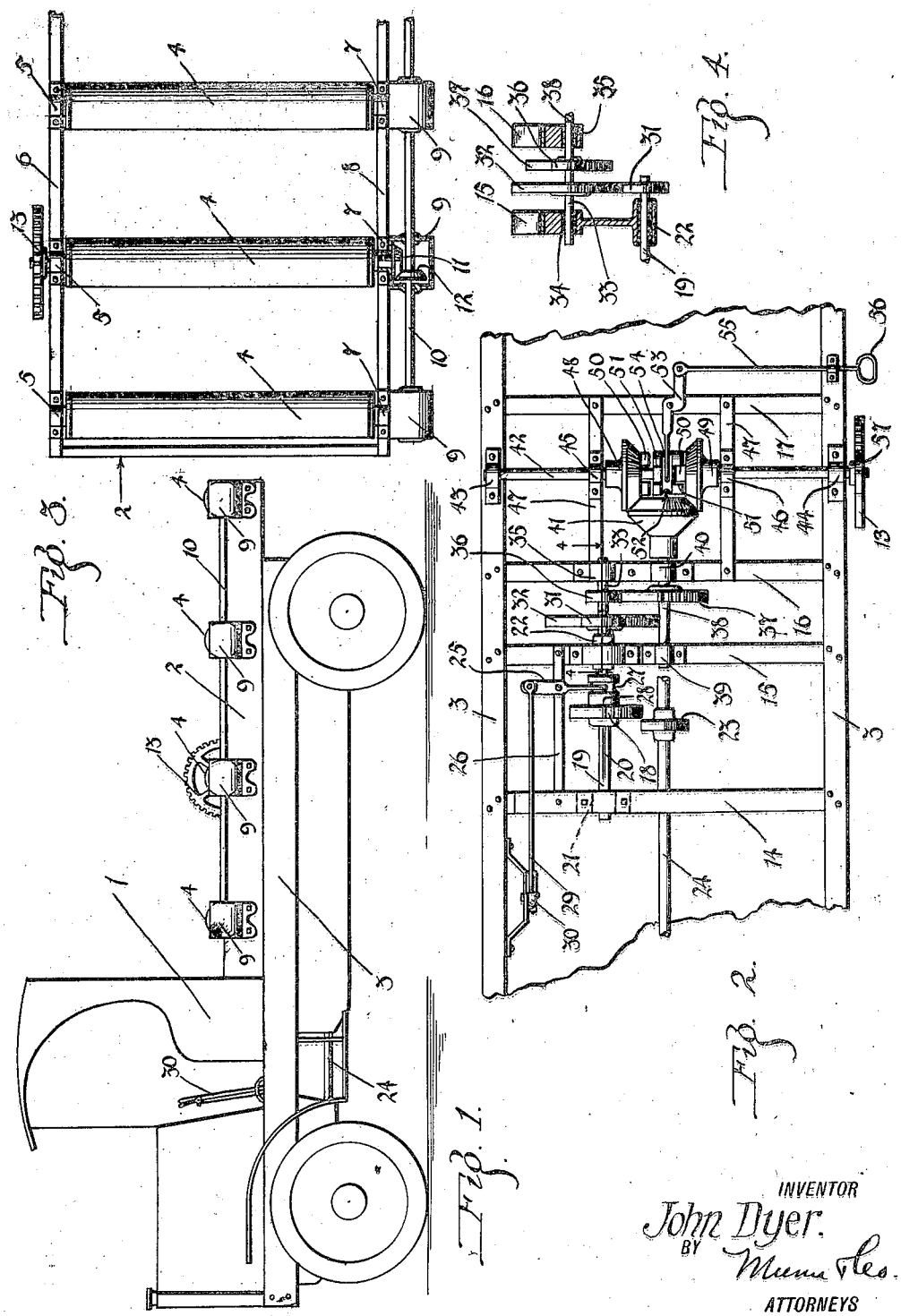
INVENTOR
John Dyer.
BY
ATTORNEYS Patented Feb. 6, 1923.

1,444,672

UNITED STATES PATENT OFFICE.

JOHN DYER, OF CHICAGO, ILLINOIS, ASSIGNOR OF ONE-HALF TO NORMAN C. MATHER, OF CHICAGO, ILLINOIS.

POWER LOADING AND UNLOADING DEVICE.

Application filed July 1, 1921. Serial No. 481,885.

*To all whom it may concern:*

Be it known that I, JOHN DYER, a citizen of the United States, and a resident of Chicago, in the county of Cook and State of Illinois, have invented a new and useful Improvement in Power Loading and Unloading Devices, of which the following is a full, clear, and exact description.

My invention relates to improvements in power loading and unloading devices, and it consists in the combinations, constructions and arrangements herein described and claimed.

An object of my invention is to provide a loading and unloading device that can readily be attached to a motor vehicle and that can be driven by power supplied by the engine or motor of the vehicle.

A further object of my invention is to provide a power driven loading and unloading device that can be easily operated by one person.

A further object of my invention is to provide a power loading and unloading device that is simple and durable in construction, and can be manufactured cheaply.

Other objects and advantages will appear in the following specification, and the novel features of the invention will be particularly pointed out in the appended claims.

My invention is illustrated in the accompanying drawings, forming part of this application, in which—

Fig. 1 is a side view of an autotruck with the device operatively applied thereto.

Fig. 2 is a partial bottom plan view of the device,

Fig. 3 is a partial top plan view of the device, partly in section, and

Fig. 4 is a section along the line 4—4 of Fig. 2.

In carrying out my invention, I make use of an autotruck 1 upon which a frame 2 is secured by suitable means to its chassis 3. A plurality of driven rollers 4 have their ends journalled to rotate in bearings 5 secured on the side 6 of the frame 2 and in bearings 7 on the side 8 of the frame 2. The bearings 7 have integral extensions 9, in which a transverse counter shaft 10 is rotatably mounted. Gears 11 carried by the rollers 4 mesh with gears 12 carried by the shaft 10. A gear 13 is carried by one of the rollers 4 on the side 6 of the frame 2.

Means for transmitting power from the engine of the auto truck to the gear 13 is provided in a transmission mechanism, which is suspended from the chassis 3 by cross pieces 14, 15, 16 and 17. This mechanism consists of a gear 18 carried on a shaft 19 and having engagement with the shaft by means of a key way 20 in the shaft 19, so that the gear may slide on the shaft 19. The shaft 19 is rotatably mounted in bearings 21 and 22, which are bolted to the cross pieces 14 and 15, respectively, in a position so that the gear 18 may have sliding engagement with a gear 23 carried by the drive shaft 24 of the autotruck.

Means for sliding the gear 18 into and out of engagement with the drive gear 23 is provided by a lever 25 pivotally mounted on a metal strap 26 and adapted to engage a groove 27 in the extended portion 28 of the gear 18. A connecting rod 29 connects the lever 25 with a hand lever 30 operated from the driver's seat of the autotruck.

The shaft 19 extends through on the opposite side of the bearing 22 and carries a gear 31. A gear 32 larger than the gear 31 is carried on a shaft 33, which is mounted in bearings 34 and 35 and has engagement with the gear 31. Support for the bearing 35 is provided in the cross piece 16.

A gear 36 is also carried on the shaft 33 and has engagement with a larger gear 37, which is carried on a shaft 38, rotatably mounted in bearings 39 and 40. Support for bearings 39 and 40 is provided in the cross pieces 15 and 16, respectively.

The shaft 38 projects through on the opposite side of the bearing 40 and carries a bevel gear 41. A shaft 42 is rotatably mounted in bearings 43 and 44 and auxiliary bearings 45 and 46 and at right angles to the shaft 38. The bearings 43 and 44 are secured to the chassis 3 of the autotruck and the bearings 45 and 46 are mounted on straps 47 secured to the cross pieces 16 and 17.

Two bevel gears 48 and 49, in mesh with the bevel gear, are rotatably mounted on the shaft 42. Means for engaging the gears 48 and 49, one at a time, with the shaft 42, is provided by projections 50 on each of the gears which are adapted to engage notches 51 in a clutch member 52. The clutch member 52 is slidably mounted on the shaft 42 so that it engages with but one of the bevel gears at a time.

Means for sliding the clutch member 52 in and out of engagement with the bevel gears 48 and 49, respectively, is provided by a lever 53 pivotally mounted on the cross piece 17 and adapted to engage a groove 54 in the clutch member 52. A connecting rod 55, having a handle grip 56, serves as a means of operating lever 53 from the side of the autotruck.

The shaft 42 extends through the bearing 44 and carries a gear 57 which is in mesh with the gear 13.

From the foregoing description of the various parts of the device, the operation thereof may be readily understood. When the operator desires to load or unload the truck, he stops the truck but leaves the engine or motor running, the drive shaft 24 with the gear 23 revolving with the engine. He then moves the hand lever 30 forward, which causes the gear 18 to slide on the shaft 19 and engage with the drive shaft gear 23. The shaft 19 then revolves, but at a speed too fast to operate the loading and unloading rollers 4. It is necessary to reduce this speed, therefore the gear 31, which is also mounted on the shaft 19 and the gears 32, 36, and 37, are engaged as has been described to form a compound reduction gear ultimately causing the shaft 38 to revolve at the desired slower speed.

The shaft 38 carries with it the bevel gear 41, which in revolving causes the bevel gears 48 and 49 to turn in opposite directions to one another on the shaft 42. The shaft 42 turns with one of the two bevel gears, dependent upon which one the clutch member 52, carried by the shaft 42, has engagement with. This arrangement constitutes a reversing gear by which the shaft 42 and the mechanism driven thereby may be revolved in one direction and reversed by moving the hand grip of the connecting rod 55 toward and away from the truck. The gear 57 carried by the shaft 42 drives the gear 13 carried by one of the rollers 4 and causes all of the rollers to turn in the same direction by means of the counter shaft 10 operatively connecting the rollers 4.

When a load is desired to be moved onto the truck, the rollers are made to revolve toward the front of the truck, the load being carried along on the rollers until it is in the position desired. In unloading the rollers are revolved away from the truck by means of the reversing gear described, causing the load to be carried to the rear end of the truck and over the end upon a receiving platform or the like.

I claim:

1. The combination with a motor vehicle comprising a motor, a drive shaft, a gear carried by said drive shaft and a load-carrying platform, of a frame mounted on said platform, a plurality of rollers mounted on said frame, means for operatively connecting said rollers, a gear carried by one of said rollers, means associated with said last named gear for transmitting power from said drive shaft to said rollers, and progressively moving materials placed thereon, said last named means comprising a reversing gear mechanism, a series of reduction gears, and a sliding gear clutch having engagement with said first named gear.

2. The combination with a motor vehicle having a drive shaft and a mechanical loading mechanism, of an auxiliary shaft rotatably mounted parallel to said drive shaft, a clutch mechanism for operatively connecting said drive shaft with said auxiliary shaft, a transverse auxiliary shaft connected with said loading mechanism, a reversing mechanism intermediate said auxiliary shafts, and a lever for manually operating said reversing mechanism arranged to project outwardly on one side of said vehicle.

JOHN DYER.